March 16, 1971  L. J. SVOREN  3,570,223
FILTER
Original Filed Feb. 7, 1966
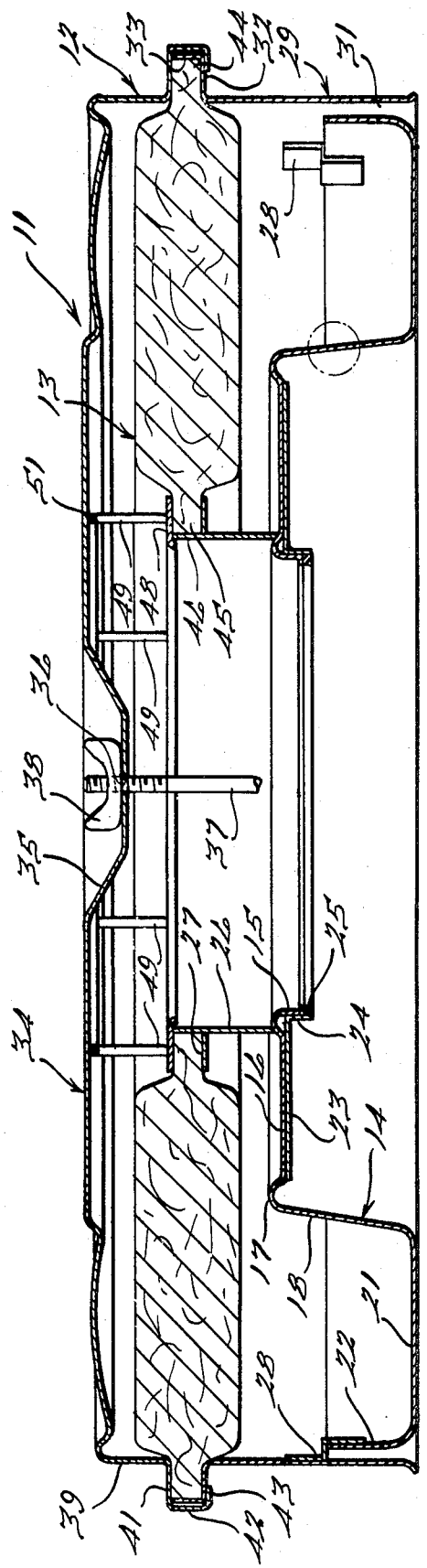
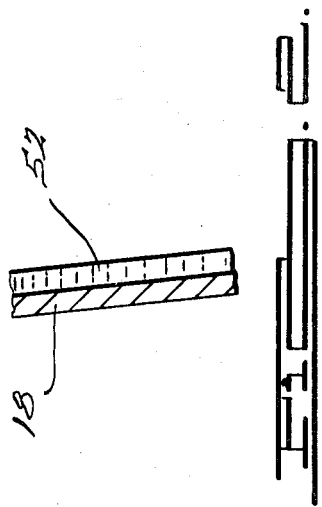
INVENTOR.
Louis J. Svoren
BY
Harness, Dickey & Pierce
ATTORNEYS United States Patent Office 3,570,223
Patented Mar. 16, 1971

3,570,223
FILTER
Louis J. Svoren, Racine, Wis., assignor to
Tenneco Inc., Houston, Tex.
Continuation of applications Ser. No. 525,636, Feb. 7, 1966, and Ser. No. 694,350, Dec. 28, 1967. This application Jan. 31, 1969, Ser. No. 809,448
Int. Cl. B01d 27/08
U.S. Cl. 55—510   4 Claims

ABSTRACT OF THE DISCLOSURE

A throw-away type air filter assembly for an internal combustion engine induction system. The air cleaner assembly includes a long life filter element and a filter housing in which the element is permanently retained so that the housing and element are replaced as a unit.

---

This application is a continuation of S.N. 525,636, filed Feb. 7, 1966 and S.N. 694,350, filed Dec. 28, 1967 now abandoned.

This invention relates to a filter for the induction system of an internal combustion engine and more particularly to a life-time air filter.

Various arrangements have been proposed for filtering the air entering an internal combustion engine's induction system to remove foreign particles from the air and preclude damage to the moving parts of the engine. The air filter should remove the foreign particles with a high degree of effectiveness, should not offer too great a restriction to the intake air flow and should have a relatively large dirt holding capacity. This last characteristic of the filter determines its service interval. That is, when a filter has accumulated such a large number of foreign particles as to significantly increase its flow restriction, it must be serviced in some manner. Depending upon the type of filter media employed, the media may either be cleaned or replaced. With the increased emphasis toward longer service intervals in internal combustion engines particularly those which power motor vehicles, there has been a demand for a new type of filter that will provide a longer service life.

It is, therefore, a principal object of this invention to provide an improved air filter having a longer service life.

Most automotive internal combustion engines now employ a so-called "dry type" filter media. Such media as pleated paper, polyurethanes and synthetic fibers fall into this category. These media are contained within a sheet metal housing which directs the air flow through the media and normally performs some silencing function for the intake air. In the normal application, however, the media must be removed from the filter housing for the aforementioned periodic servicing. This necessitates construction of the filter housing which may be opened for removal of the media and thus requires an effective seal between the housing and the filter element when it is repositioned within the housing. The sealing requirement magnifies the cost of the filter assembly and complicates its design.

It is, therefore, a further object of this invention to provide an improved combination of air filter housing and filter media.

It is a still further object of this invention to provide an air filter for an engine induction system that does not require periodic servicing.

It is a still further object of this invention to provide a life-time air filter for an internal combustion engine.

A life-time air filter for an internal combustion engine embodying this invention is comprised of a housing member and an air filtration media. The housing member defines an induction system air inlet, an air outlet that is adapted to register with the engine induction system and a filtering chamber between the air inlet and the air outlet. The air filtration media is permanently fixed within the housing member filtering chamber for filtering the air flowing into the engine induction system.

Other objects and advantages of this invention will become more apparent as this description proceeds, particularly when considered in conjunction with the accompanying drawings, wherein:

FIG. 1 is a cross sectional view taken through a lifetime air filter embodying this invention; and FIG. 2 is an enlarged view of the encircled area in FIG. 1.

Referring now in detail to FIG. 1 of the drawings, a life-time air filter for the induction system of an internal combustion engine is identified generally by the reference numeral 11. The filter 11 is comprised of a housing assembly 12 and a filter media 13 that is permanently supported within the housing assembly 12.

The housing assembly 12 is comprised of a lower sheet metal tray, indicated generally by the reference numeral 14. The tray 14 is formed with a short cylindrical section 15 that defines an air outlet that is adapted to communicate with a carburetor air horn (not shown) or other air inlet of an internal combustion engine induction system. Adjacent the air outlet 15, the tray 14 is formed with a substantially radially extending annular portion 16 that terminates in a raised annular rib 17. The rib 17 is integrally connected to a downwardly sloping frusto-conical wall 18 that merges into a radially extending annular portion 21. The outer end of the annular portion 21 is formed with an upstanding wall 22 of generally cylindrical shape.

Affixed, as by spot welding, to the radial tray portion 16 is a radially extending sheet metal member 23 formed with a depending flange 24 around which a sealing gasket 25 is positioned. The gasket 25 is positioned at the lower end of the air outlet 15 for sealing engagement between the air filter assembly 11 and the carburetor air horn.

A cylindrical upstanding member 26 is affixed to the tray 14 adjacent to and concentrically with the air outlet 15. The cylindrical member 26 forms an extension of the air outlet 15 that extends into the upper portion of the housing assembly 12. A radially extending ledge 27 is formed by an annular sheet metal member that is affixed, as by spot welding, at spaced locations to the cylindrical member 26 below its upper extremity.

A plurality of Z-shaped tabs 28 have one of their legs fixed to the upstanding outer cylindrical wall 22 of the tray 14 as spaced circumferential locations. The other leg of each of the tabs 28 is spot welded to a generally cylindrical skirt 29 that is spaced outwardly from the cylindrical tray portion 22 to define a long, narrow air inlet passage 31. The air inlet passage 31 provides substantially a 360° annular air inlet channel for the air filter assembly 11 and, due to its shape, imparts some turbulence to the incoming air for a reason which will become more apparent as this description proceeds. A radially extending flange 32 is integrally formed at the upper end of the skirt 29. The flange 32 terminates in an integral upstanding cylindrical portion 33.

The housing assembly 12 is completed by means of a sheet metal cover member, indicated by the reference numeral 34. The cover member 34 has a generally diskshaped upper portion with a depressed central part 35 in which an aperture 36 is formed. A hold down stud 37 extends through the aperture 36 and is affixed at its lower end in any known manner to a suitable component of the engine induction system. A wing nut 38 is threaded onto the upper end of the hold down stud 37 to fix the filter assembly 11 with respect to the engine induction system. In addition, tightening the wing nut 38 onto the hold down stud 37 exerts a sealing pressure upon the gasket 25.

The outer extremity of the cover 34 is formed with an integral cylindrical portion 39 that terminates in a radially outwardly extending flange 41 from which a cylindrical portion 42 depends. The cylindrical portion 42 parallels the skirt cylindrical portion 33 and is positioned slightly radially outwardly from it. An inwardly folded radially extending flange 43 of the cover member 34 engages the radially extending portion 32 of the skirt 29 to affix the skirt 29 and tray 14 with respect to the cover member 34. In addition, the outer periphery of the filter media 13 is sealingly engaged around its periphery between the facing flanges of the skirt 29 and cover 34, as will become more apparent as this description proceeds.

Since the filter assembly 11 is intended to be a lifetime filter, it should have sufficient dirt holding capacity without significant increase in flow restriction to handle all of the foreign particles that are anticipated during the life of the assembly. In automotive usage, the filter assembly 11 should have a design life of at least 100,000 miles and more preferably 200,000 miles. It will then exceed the life of the engine. To suit the 200,000 mile requirement, the filter assembly 11 should have a dirt holding capacity under manufacturers' test requirements of at least 800 grams of foreign particles. This amount of dirt must be trapped without a detrimental increase in the flow resistance of the filter media 13 and without a significant decrease in the efficiency of the filter assembly 11. Any suitable media for accomplishing these dirt holding, flow restriction and efficiency requirements may be employed. In a preferred embodiment of the invention, a filter media 13 of randomly disposed synthetic fibers secured together with a binder and having a relatively low density was found to give satisfactory results. Preferably, the media 13 is treated with a suitable impingement fluid to increase its dirt holding capacity. In one embodiment, a dirt holding capacity of 966 grams was possible before the flow resistance of the media 13 exceeded the acceptable limit. The media 13 maintained in 98% efficiency even when it had accumulated this amount of foreign particles.

The media 13 is generally annular shaped. The annular shape and axial air flow through the media 13 permits it to present a relatively large surface to the flow. Since the flow area is larger than with conventional, cylindrical elements, a greater dirt holding capacity is possible. The media 13 has an outer periphery 44 that is engaged between the adjacent flanges of the cover 34 and skirt 29 and sealingly engage therebetween. An inner periphery 45 of the media 13 defines a central opening 46 that is in sealing engagement with the cylindrical member 26 around its periphery. The portion 45 is compressed against the outstanding ledge 27 by means of an annular sealing member 48 that has a plurality of upstanding projections 49 affixed to it. The upper ends of the projections 49 are fixed to a ring 51 that engages or is otherwise fixed relative to the cover member 34 so that when the cover member 34 is affixed to the remainder of assembly, a sealing pressure will be exerted upon the filter portion 45.

It should be readily apparent that the rigid connection of the cover member 34 to the skirt 29 and tray 14 permanently contains the filter media 13 within the filter housing assembly 12. When the term "permanent" is used herein and in the claims, it is intended to cover any structure wherein the filter media is contained rigidly within an air filter housing so that it cannot be periodically replaced or serviced. Said another way, the entire filter assembly comprising the media and filter housing must be replaced rather than the media per se.

It has previously been noted that the design of the annular air inlet 31 creates some turbulence in the intake air flow. In addition, the annular volume defined by the depressed outer periphery of the tray 14 experiences and promotes this turbulence to improve the silencing characteristics of the filter assembly 11. Its dirt holding capacity also may be increased by providing a film of some relatively viscous impingement fluid 52 (FIG. 2) on the surface of the tray 14 and skirt 29 on the air inlet side of the filter media 13. It has been found that this treating of the sheet metal will provide an additional 230 grams of dirt holding capacity so that the entire unit has a capacity of nearly 1200 grams. Thus, nearly 20% of the dirt holding capacity of the preferred embodiment of the filter assembly 11 is provided by the treated surface of tray 14 and skirt 29.

After the intake air has passed through the air inlet channel 31 and circulated within the volume defined by the tray 14, skirt 29 and lower surface of the filter media 13, the air will flow upwardly through the filter media 13. After the filter air leaves the media 13 it will be turned through 90° by impingement with the cover 34 and again through 90° so that it will pass into the engine induction system through the channel defined by the tubular member 26 and the air outlet 15 of the tray 14.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An air filter assembly for an internal combustion engine comprised of an air filter housing and an air filtration media permanently affixed within said housing and replaceable with said housing, said housing comprising a tray having a radially inwardly extending portion defining a central air outlet opening adapted to register with an associated component of the induction system of the engine, said tray further having a cylindrical wall portion connected thereto extending upwardly from its outer periphery, said cylindrical wall portion having a first radially outwardly extending flange formed at the upper end opposite to said radially extending portion, said tray further defining a second flange extending around said air outlet opening and spaced axially therefrom, said first and said second flanges being concentric, said air filtration media being of the depth type and having substantially annular configuration, one side of the outer periphery of said filtration media being sealingly engaged with said first flange, the corresponding one side of the inner periphery of said filtration media being sealingly engaged with said second flange, said filter housing further including a cover plate, said cover plate being formed with a third flange at its outer periphery sealingly engaged with the other side of the outer periphery of said filtration media and juxtaposed to said first flange, said first and said third flanges being permanently interlocked together, and a fourth flange connected to said cover plate in axially spaced relationship thereto, said fourth flange being sealingly engaged with the inner periphery of said filtration media on its other side and adjacent said second flange, said filtration media dividing said air filter housing into first and second chambers, said first chamber being in communication with said center air outlet opening for air flow from said first chamber into said air outlet opening, and means for providing an air inlet to said second chamber for the flow of induction air through said air inlet into said second chamber and subsequently through said filtration media.

2. An air filter assembly as set forth in claim 1 wherein a substantially imperforate cylindrical member affixes the second flange to the tray in axially spaced relationship from the radially extending portion of said tray, the second chamber being defined by the one side of the air filtration media, said tray and said imperforate cylindrical member.

3. An air filter assembly for an internal combustion engine comprised of an air filter housing and an air filtration media permanently affixed within said housing and replaceable with said housing, said housing comprising a tray defining a central air outlet opening adapted to register with an associated component of the induction system of the engine, said tray further having a cylindrical flange portion formed at its outer periphery, a skirt permanently affixed to said tray adjacent said cylindrical flange portion, said skirt being disposed radially outwardly of said cylindrical portion and extending at least in part along a portion of the length of said cylindrical portion for defining an annular air inlet, said skirt having a radially extending flange formed at the end opposite to said cylindrical portion, said tray further defining a flange extending around said air outlet opening, said air filtration media being of the depth type and having substantially annular configuration, one side of the outer periphery of said filtration media being sealingly engaged with said flange of said skirt, one side of the inner periphery of said filtration media being sealingly engaged with said flange of said tray, said filter housing further including a cover plate, said cover plate being formed with a flange at its outer periphery sealingly engaged with the other side of the outer periphery of said filtration media and juxtaposed to said flange of said skirt, said flanges of said cover plate and of said skirt being permanently interlocked together, and a second flange affixed to said cover plate in spaced relationship thereto, said second flange being sealingly engaged with the inner periphery of said filtration media on its other side and adjacent said flange of said tray.

4. An air filter assembly for an internal combustion engine comprised of an air filter housing and an air filtration member permanently affixed within said housing and replaceable with said housing, said housing comprising a tray member having a radially inwardly extending portion defining a central air outlet opening adapted to register with an associated component of the induction system of the engine, said tray member further having a cylindrical wall portion connected thereto extending upwardly from its outer periphery, said cylindrical wall portion having a first radially outwardly extending annular flange formed at the upper end opposite to said radially extending portion, said filter housing having a second annular flange extending around said air outlet opening and spaced axially therefrom including an annular outwardly extending portion, said first and said second flanges being concentric, said filter housing further including a cover plate member formed with a third radially outwardly extending annular flange at its outer periphery and axially aligned with the first flange, said filter housing further including a fourth radially outwardly extending annular flange axially aligned with the second flange secured to said housing, said air filtration member being of the depth type and comprising an annular fibrous pad of substantially uniform thickness having substantially coplanar and medially located inner and outer peripheries of reduced thickness, said outer periphery of said filtration member being clamped and sealed between the first and third flanges, said inner periphery of said filtration member being clamped and sealed between the second and fourth flanges, said first and said third flanges being permanently interlocked together, said filtration member dividing said air filter housing into first nd second chambers, said first chamber being in communication with said central air outlet opening for air flow from said first chamber into said air outlet opening, and means for providing an air inlet to said second chamber for the flow of induction air through said air inlet into said second chamber and subsequently through said filtration member.

References Cited

UNITED STATES PATENTS

| 1,639,170 | 8/1927 | Fell | 210—452 |
| 2,980,203 | 4/1961 | Lutke | 55—503 |
| 2,999,562 | 9/1961 | Lechtenberg | 55—502 |
| 3,076,555 | 2/1963 | Jackson et al. | 55—502 |

FOREIGN PATENTS

| 825,299 | 12/1959 | Great Britain | 55—510 |

FRANK W. LUTTER, Primary Examiner

B. NOZICK, Assistant Examiner

U.S. Cl. X.R.

55—524, 528, 529